United States Patent
Kobayashi

(12) 
(10) Patent No.: US 10,122,239 B2
(45) Date of Patent: Nov. 6, 2018

(54) ROTARY ACTUATOR

(71) Applicant: HARMONIC DRIVE SYSTEMS INC., Shinagawa-ku, Tokyo (JP)

(72) Inventor: Syuhei Kobayashi, Azumino (JP)

(73) Assignee: Harmonic Drive Systems Inc., Shinagawa-ku, Tokyo (JP)

( * ) Notice: Subject to any disclaimer, the term of this patent is extended or adjusted under 35 U.S.C. 154(b) by 189 days.

(21) Appl. No.: 15/326,049

(22) PCT Filed: Aug. 12, 2014

(86) PCT No.: PCT/JP2014/071337
§ 371 (c)(1),
(2) Date: Jan. 13, 2017

(87) PCT Pub. No.: WO2016/024340
PCT Pub. Date: Feb. 18, 2016

(65) Prior Publication Data
US 2017/0222517 A1 Aug. 3, 2017

(51) Int. Cl.
*H02K 7/116* (2006.01)
*H02K 7/102* (2006.01)
*H02K 11/21* (2016.01)
*H02K 1/27* (2006.01)
*F16H 49/00* (2006.01)

(52) U.S. Cl.
CPC .......... *H02K 7/116* (2013.01); *H02K 1/2786* (2013.01); *H02K 7/102* (2013.01); *H02K 11/21* (2016.01); *F16H 49/001* (2013.01)

(58) Field of Classification Search
CPC .... F16H 49/001; H02K 11/21; H02K 1/2786; H02K 7/102; H02K 7/116; H02K 7/083

USPC ....................................................... 310/68 B
See application file for complete search history.

(56) References Cited

U.S. PATENT DOCUMENTS

2011/0314950 A1 12/2011 Mamba
2012/0313461 A1* 12/2012 Takeuchi ............... H02K 1/278
310/43

(Continued)

FOREIGN PATENT DOCUMENTS

JP 60-166259 U 11/1985
JP 3-54352 U 5/1991

(Continued)

OTHER PUBLICATIONS

Translation of foreign document JP 60166259 U (Year : 1985).*

(Continued)

*Primary Examiner* — Alex W Mok
(74) *Attorney, Agent, or Firm* — Buchanan Ingersoll & Rooney PC

(57) ABSTRACT

The rotary actuator has an outer rotor type motor assembled coaxially in a device hollow part of a strain wave gearing. One end of the device hollow part is closed by an end cover fixed to an output shaft of the strain wave gearing. A detection part is arranged between the motor and the end cover inside the device hollow part. A rotational position of a rotation detection plate mounted on an inside end surface of the end cover is detected by the detection part, to detect the rotational position of the output shaft. A rotary actuator that is small and compact can be realized.

12 Claims, 3 Drawing Sheets

(56) References Cited

U.S. PATENT DOCUMENTS

2013/0026861 A1* 1/2013 Takeuchi ................. H02K 3/47
310/43
2014/0184002 A1* 7/2014 Levin ..................... H02K 41/06
310/90

FOREIGN PATENT DOCUMENTS

JP           5197174 B2    5/2013
JP           5327312 B2   10/2013

OTHER PUBLICATIONS

Translation of foreign document JP 03054352 U (Year : 1991).*
International Search Report (PCT/ISA/210) dated Oct. 21, 2014, by the Japanese Patent Office as the International Searching Authority for International Application No. PCT/JP2014/071337.
Written Opinion (PCT/ISA/237) dated Oct. 21, 2014, by the Japanese Patent Office as the International Searching Authority for International Application No. PCT/JP2014/071337.

* cited by examiner

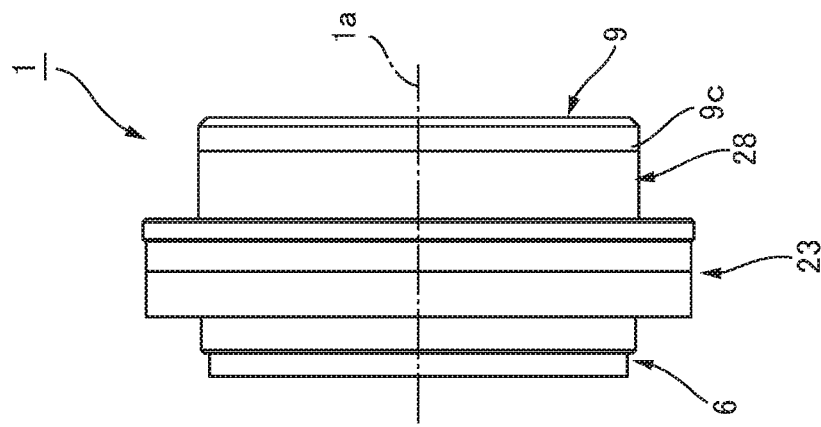
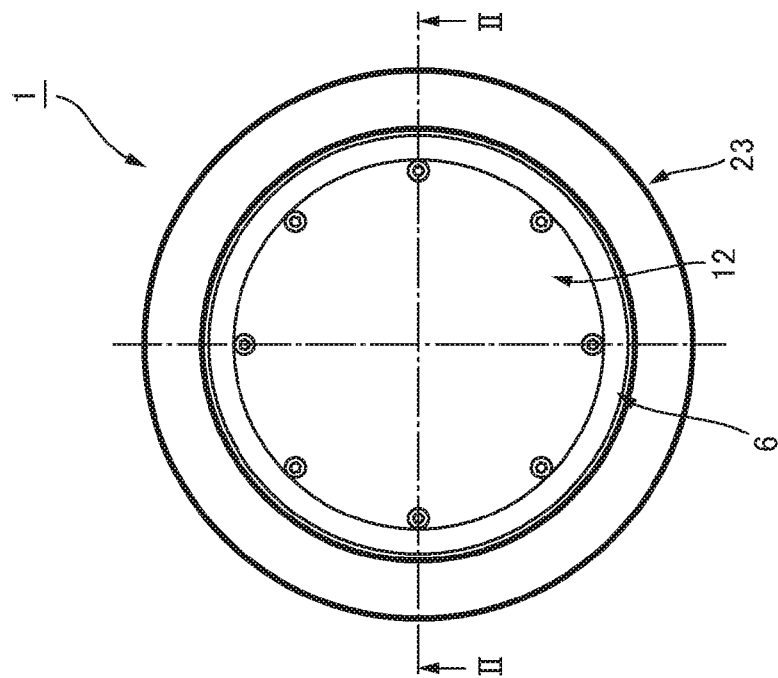

ROTARY ACTUATOR

TECHNICAL FIELD

The present invention relates to a rotary actuator in which an outer-rotor-type motor is assembled in a hollow part of a hollow-type strain wave gearing.

BACKGROUND ART

It has been known a rotary actuator in which an output rotation from a motor is reduced in speed via a strain wave gearing and is output therefrom. As disclosed in Patent document 1, the rotary actuator of this configuration has a strain wave gearing, a motor and an encoder (a brake mechanism) arranged in the axial line direction, and the dimension thereof in the axial line direction becomes large.

Patent Document 2 discloses a rotary actuator having a strain wave gearing and a motor assembled in a hollow part of the strain wave gearing. In this rotary actuator, the motor of outer rotor type has a rotor constituted by the rigid plug of a wave generator of the strain wave gearing and a rotor magnet adhered on the inner peripheral surface of the rigid plug. With this structure, a flat rotary actuator having a small dimension in the axis line direction is obtained.

PRIOR ART DOCUMENT

Patent Document

[Patent Document 1] JP 5197174 B
[Patent Document 2] JP 5327312 B

SUMMARY OF THE INVENTION

Problems to be Solved by the Invention

An object of the present invention is to realize a further compact rotary actuator in which an outer-rotor-type motor is assembled in a hollow part of a strain wave gearing.

Means of Solving the Problems

In order to solve the above problems, a rotary actuator of the present invention is characterized by having:
an outer-rotor-type motor;
a strain wave gearing which reduces a speed of input rotation inputted from the motor and outputs a reduced-speed rotation;
a device hollow part extending to pass through a wave generator and an output shaft of the strain wave gearing along a direction of a center axis line of the wave generator and the output shaft;
an end cover which is fixed to the output shaft so as to rotate integrally, and closes an output-side opening of the device hollow part, the outputs-side opening being exposed on an end face of the output shaft; and
a detection part for detecting rotation of the output shaft,
wherein the motor has a stator and a rotor assembled in a wave generator-side hollow part of the device hollow part, the wave generator-side hollow part extending to pass through the wave generator; and
the detection part is arranged between the end cover and the motor in the device hollow part.

In the rotary actuator of the present invention, the device hollow part has one opening end which is closed by the end cover mounted on the output shaft. The end cover prevents water, dust or other foreign substances from entering the device from outside. Further, a space between the end cover and the motor serves an installation site for the detection part (sensor substrates et al). It is of course that this space can be used as an installation site for a motor circuit board (for example, a motor wiring board et al).

The motor and the detection part are assembled in the device hollow part, so that a flat rotary actuator can be realized.

Here, it is preferable that the end cover is provided with a rotation detection plate for the detection part to detect the rotational position of the output shaft.

The end cover for preventing entry of water, dust or other foreign substances is mounted on the output shaft and is rotated integrally with the output shaft. The end cover may be provided with a rotation detection plate such as a slit disc of a rotary encoder, or it may be formed integrally with a rotation detection plate of a rotary encoder, whereby there is no need to obtain a space for the rotation detection plate to assemble in a separate manner. This allows to make the detector more compact, and in particular, make the dimension thereof in the axial line direction more small.

In a case where the stator has a stator core formed with a motor hollow part extending to pass therethrough in the center axis direction, and an end of the motor hollow shaft exposes outside from an anti-output side opening end of the device hollow part, the anti-output side opening end being opened on the end face of the wave generator, it is preferable that the wiring of the detection part is passed through the motor hollow part and is pulled out to the outside.

If the wiring of the detection part is pulled out to the outside in the radial direction and then is drawn along the outer periphery side portion of the rotary actuator, the wiring may interfere with the outer peripheral surface of the rotary actuator or other portions. Such defects can be avoided by making use of the motor hollow part for a wiring space.

Further, in this case, it is preferable that the motor hollow part is sealed together with the wiring in a state in which the wiring has been pulled out therefrom.

Next, in a case where the wave generator has a tubular rigid plug made of magnetic material and a wave-generator bearing fitted on a non-circular outer peripheral surface formed in the rigid plug, it is preferable that the rotor of the motor is constituted by the rigid plug and rotor magnets fixed on the inner peripheral surface of the rigid plug. It is also preferable that the rigid plug is supported by a first bearing and a second bearing from outer peripheral side at both positions of the wave-generator bearing in the direction of the center axis line in a manner sandwiching the wave-generator bearing.

Since the rigid plug of the wave generator is shared as a rotor yoke of the motor, it is possible to suppress increase in dimension in the radial direction of the rotary actuator. Further, the rigid plug is supported on both sides by the first and second bearings, so that the rigidity for supporting the rotor can be enhanced.

In this case, it is preferable that the output shaft is arranged at the side of the first bearing in the center axis direction, while a brake mechanism for applying a brake force on the rotor is arranged at the side of the second bearing.

In the rotary actuator, the portion, in which the wave generator, a flexible externally toothed gear and a rigid internally toothed gear are arranged in the radial direction, is large in outer diameter dimension. A dead space is formed in an outer-peripheral-side portion of the actuator, which is located adjacent to the above portion in the axial line direction. By utilizing this portion for arranging the brake mechanism, it is possible to assemble the brake mechanism into the rotary actuator without increase in both dimensions of axis line direction and radial direction.

Next, the anti-output-side opening of the device hollow part, which is opposite to the output-side opening, can be closed by the stator. In this case, the following structure can be adopted, for example. Specifically, the stator core of the stator has a core cylindrical part and core end plate part, in which the core cylindrical part is arranged coaxially in the device hollow part in a manner that one end of the core cylindrical part projects from the anti-output-side opening of the device hollow part exposed in the end face of the wave generator, and the core end plate part is extended outward in the radial direction from the end of the core cylindrical part so as to close the anti-output-side opening.

Here, it is preferable that a strain wave gearing called as the flat type or the silk-hat type is employed in order to assure the device hollow part of a large inner diameter.

A flat-type strain wave gearing can be employed as the strain wave gearing. In this case, the following structure is preferably adopted. The strain wave gearing has a first rigid internally toothed gear and a second rigid internally toothed gear arranged coaxially in parallel along the center axis direction, a main bearing for supporting the first and second rigid internally toothed gears in a relatively rotatable manner, and a cylindrical flexible externally toothed gear arranged inside the first and second rigid internally toothed gears. The wave generator has a rigid plug made of magnetic material and a wave-generator bearing accommodated between the flexible externally toothed gear and a non-circular profile outer peripheral surface formed on the rigid plug.

Further, the output shaft is integrally formed or fixed on a section of the first rigid internally toothed gear located at a side opposite to the second rigid internally toothed gear. A tubular case is integrally formed or fixed on a section of the second rigid internally toothed gear located at a side opposite to the first rigid internally toothed gear. The rigid plug is supported in a free rotating manner by a first bearing and a second bearing, in which the first bearing is mounted on the inner peripheral surface of the output shaft located at one side in the center axis line direction and the second bearing is mounted on the inner peripheral surface of the tubular case located at the other side in the center axis line direction, the first and second bearing being positioned sandwiching the wave generator.

Furthermore, the wave-generator-side hollow part extends to pass through the rigid plug in the center axis direction, and the motor stator has a stator core arranged coaxially in the wave-generator-side hollow part and a stator coil arranged on the outer peripheral surface of the stator core. The motor rotor has the rigid plug and a rotor magnet fixed on the inner peripheral surface of the rigid plug. The stator core has a core cylindrical part and a core end plate part, in which the core cylindrical part is arranged coaxially in the device hollow part in a manner that one end of the core cylindrical part projects from the anti-output-side opening of the device hollow part exposed in the end face of the wave generator, the core end plate part is extended outward in the radial direction from the end of the core cylindrical part to close the anti-output-side opening, and an outer circumferential end part of the core end plate part is fixed to the tubular case.

BRIEF DESCRIPTION OF THE DRAWINGS

FIGS. 1(a) and 1(b) include an end view showing an output-side end face of a rotary actuator according to the present invention, and a side view thereof;

MODE FOR CARRYING OUT THE INVENTION

With reference to the drawings, an embodiment of the rotary actuator according to the present invention will be described below.

(Overall Structure)

Figure 2:
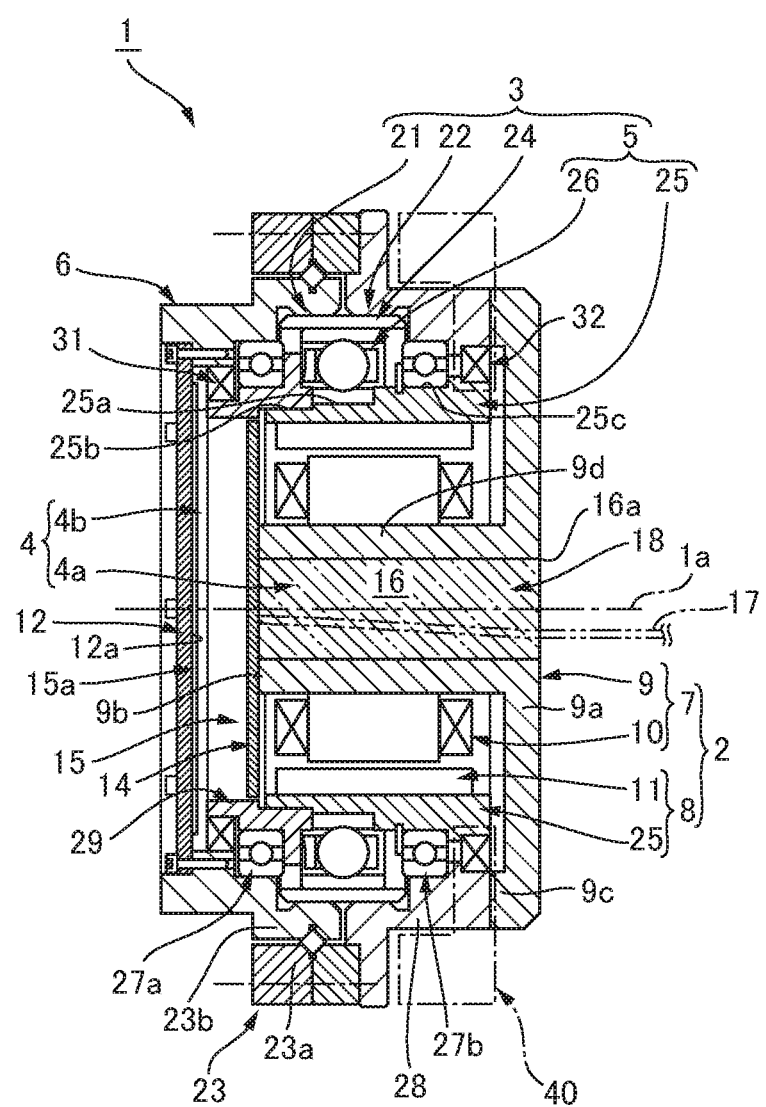
FIG. 2 is a schematic lateral sectional view showing a portion cut across a line II-II FIGS. 1(a) and 1(b)

Referring to FIGS. 1(a), FIGS. 1(b) and 2, a rotary actuator 1 according to this embodiment has an outer-rotor-type hollow motor 2 and a strain wave gearing 3 that reduces the speed of input rotation inputted from the hollow motor 2 and outputs a reduced-speed rotation.

The strain wave gearing 3 is provided with a device hollow part 4 extending and passing through the center portions thereof in the direction of the center axis line 1a. The device hollow part 4 is constituted by a wave-generator-side hollow part 4a extending to pass through a wave generator 5 which is an input element of the strain wave gearing 3, and an output-shaft-side hollow part 4b extending to pass through an output shaft 6 which is an output element of the strain wave gearing 3. In the following explanation, when viewed along the direction of the center axis line 1a, the side of the output shaft 6 is called as an output side, and the other side opposite to the output shaft 6 is called as an anti-output side.

The hollow motor 2 has a stator 7 and a rotor 8 assembled in the wave-generator-side hollow part 4a of the device hollow part 4. The stator 7 has a cylindrical hollow stator core 9 arranged coaxially in the wave-generator-side hollow part 4a, and a stator coil 10 mounted on the outer peripheral surface of the stator core 9. The rotor 8 is constituted by the wave generator 5 (exactly a rigid plug 25 of the wave generator 5 which will be described later) and a rotor magnet 11 fixed on the inner peripheral surface of the wave generator 5 (namely, the inner peripheral surface of the wave-generator-side hollow part 4a). The rotor magnet 11 faces the stator coil 10 at a constant gap from the outer circumferential side.

An output-side opening end, which is an opening at the side of the output-shaft-side hollow part 4b of the device hollow part 4 formed in the output shaft 6, is closed by a discoid-shaped end cover 12 fixed to the output shaft 6 so as to integrally rotate with each other. The stator core 9 has a core cylindrical part 9d arranged coaxially in the wave-generator-side hollow part 4a and a core end plate part 9a. An end of the core cylindrical part 9d projects from an anti-output-side opening which is an opening at the side of the wave-generator-side hollow part 4a. The core end plate part 9a is a circular-contoured plate part bending perpendicularly and outward in the radial direction from the end of the core cylindrical part. The anti-output-side opening of the device hollow part 4 is closed by the core end plate part 9a.

(Detection Part)

In the device hollow part 4, there is formed a flat space of circular section between the end cover 12 and the hollow motor 2, the space having a prescribed width in the direction of the center axis line 1a. In the space, a motor circuit board 14 is arranged in a manner perpendicular to the center axis line 1a at the side of the hollow motor 2, and is fixed to an annular end face 9b of the stator core 9. An input-shaft sensor part for detecting rotation of the rotor 8 (input shaft)

and an output-shaft sensor part for detecting rotation of the output shaft 6 are mounted on the motor circuit board 14 at the end cover 12 side.

In this embodiment, a rotation detection plate 15*a* whose rotational position is detected by the output-shaft sensor part (not shown) is mounted on an inner side end face 12*a* of the end cover 12, the inner side end face 12*a* facing the output-shaft sensor part of the detection part 15 along the direction of the center axis line 1*a*. For example, when an optical rotary encoder is used, the rotation detection plate 15*a* is a circular disc having reflection zones formed at constant intervals along the circumferential direction thereof, and the output-shaft sensor part is a reflective photosensor. It is also possible to employ a magnetic sensor mechanism.

Here, one end of the hollow part 16 of the stator core 9 (motor hollow part) in the direction of the center axis line 1*a* is closed by the motor circuit board 14, and the other end thereof is an opening end 16*a*. A plurality of wires 17 extending from the motor circuit board 14 and the detection part 15 are passed through the hollow part 16 and are pulled out from the opening end 16*a*. The hollow part 16 is sealed by a sealing material 18 filled into the hollow part in a state of the wires 17 being pulled out.

(Strain Wave Gearing)

The strain wave gearing 3 of this example is a flat-type strain wave gearing and has a first rigid internally toothed gear 21 and a second internally toothed gear 22 arranged coaxially in parallel in the direction of the center axis line 1*a*. The first and second rigid internally toothed gears 21 and 22 are supported in a free relative rotating manner by a cross roller bearing 23 as a main bearing. The cross roller bearing 23 has an outer race 23*a* which is fixed to the second rigid internally toothed gear 22 and an inner race 23*b* which is formed integrally in the outer peripheral portion of the first rigid internally toothed gear 21. A cylindrical flexible externally toothed gear 24 is arranged inside the first and second rigid internally toothed gears 21 and 22. A wave generator 5 is arranged inside the flexible externally toothed gear 24.

The wave generator 5 has a cylindrical rigid plug 25 made of magnetic material and a wave-generator bearing 26 accommodated between the flexible externally toothed gear 24 and a non-circular contoured outer peripheral surface portion 25*a*. Although a ball bearing is employed as the wave-generator bearing 26, a roller bearing can also be employed to reduce the radial dimension. The rotor magnet 11 is fixed on the inner peripheral surface of the rigid plug 25, and the rotor 8 is constituted by the rigid plug 25 and the rotor magnet 11. Therefore, the wave generator 5 of the strain wave gearing 3 is directly driven to rotate by the motor 2.

The rigid plug functioning as the rotor 8 is supported by a first bearing 27*a* and a second bearing 27*b* at both side sections of the wave-generator bearing 26 in the direction of the center axis line 1*a*. The mounting structure of the first and second bearings 27*a* and 27*b* will be described below.

In this example, the output shaft 6 of an annular shape is formed integrally in the output-side section of the first rigid internally toothed gear 21 (an opposite side to the second rigid internally toothed gear 22). The output shaft 6 can be manufactured as a separate component part and fixedly fastened to the first rigid internally toothed gear 21 in a coaxial manner. Further, a cylindrical case 28 (tubular case) is integrally formed in a section of the second rigid internally toothed gear 22 opposite to the first rigid internally toothed gear 21. The cylindrical case 28 can be manufactured as a separate component part and fixedly fastened to the second rigid internally toothed gear 22 in a coaxial manner. The stator core 9 of the motor 2 is fixedly fastened to the cylindrical case 28 in a coaxial manner. Specifically, an annular outer peripheral side end part 9*c* of the core end plate part 9*a* of the stator core 9 is fixedly fastened to the annular end face of the cylindrical case 28 in a coaxial manner.

The first bearing 27*a* is accommodated between the inner peripheral surface of the output shaft 6 and the outer peripheral surface of a cylindrical member 29, the cylindrical member 29 being fixed coaxially to the output-side shaft end part of the rigid plug 25. Specifically, adjacent to the ellipsoidal outer peripheral surface portion 25*a* of the rigid plug 25, there is formed a circular outer peripheral surface portion 25*b*, to which the cylindrical member 29 is coaxially fixed. One shaft end part of the rigid plug 25 is supported via the cylindrical member 29 by the first bearing 27*a*.

The inner peripheral surface of the cylindrical case 28 at the side of the second rigid internally toothed gear 22 faces a circular outer peripheral surface 25*c* of the rigid plug 25, the outer peripheral surface 25*c* being adjacent to the ellipsoidal outer peripheral surface 25*a*. The second bearing 27*b* is accommodated between the inner peripheral surface of the cylindrical case and the outer peripheral surface 25*c*. In other words, the anti-output-side shaft end part of the rigid plug 25 is supported by the second bearing 27*b*.

As mentioned above, the rigid plug 25 functioning as the rotor 8 of the motor 2 is a cylinder that is long in the axis line direction, and the shaft ends of both sides thereof are supported by the first and second bearings 27*a* and 27*b*. Therefore, the rigidity for supporting the rigid plug 25 can be enhanced.

Here, in this example, a first oil seal 31 is arranged at the output side of the first bearing 27*a*, which prevents lubricant from entering the inside of the hollow motor 2 from the side of the strain wave gearing 3. The first oil seal 31 is accommodated between the outer peripheral surface of the cylindrical member 29 and the inner peripheral surface of the output shaft 6. Likewise, a second oil seal 32 is arranged at the anti-output side of the second bearing 27*b*. The second oil seal 32 is accommodated between the outer peripheral surface portion of the shaft end part of the rigid plug 25 and the inner peripheral surface of the cylindrical case 28 integrally formed in the second rigid internally toothed gear 22.

As shown by the dashed line in FIG. 2, a brake mechanism 40 can be assembled in the rotary actuator 1. In the rotary actuator 1, the flexible externally toothed gear 24 and the first and second rigid internally toothed gears 21 and 22 of the strain wave gearing 3 are arranged at the outer peripheral side of the portion where the wave-generator bearing 26 is arranged. Therefore, the portion of the rotary actuator 1 where the wave-generator bearing is arranged is large in outer diameter dimension. In the anti-output-side of this portion, there is formed a dead space at the outer peripheral side portion thereof. By making use of this dead space for arranging the brake mechanism 40, it is possible to assemble the brake mechanism 40 in the rotary actuator 1 without increase in dimensions of the center axis 1*a* direction and the radial direction.

According to the thus configurated rotary actuator 1, the rotation of the motor 2 is reduced in speed by the strain wave gearing 3, and a reduced-speed rotation is derived from the output shaft 6 via the first rigid internally toothed gear 21. The rotation of the output shaft 6 is detected by the detection part 15. Specifically, the detection part 15 detects the rotational position of the rotation detection plate 15*a* mounted on the end cover 12 which rotates integrally with the output shaft 6.

Modified Example of Rotary Actuator

Figure 3:
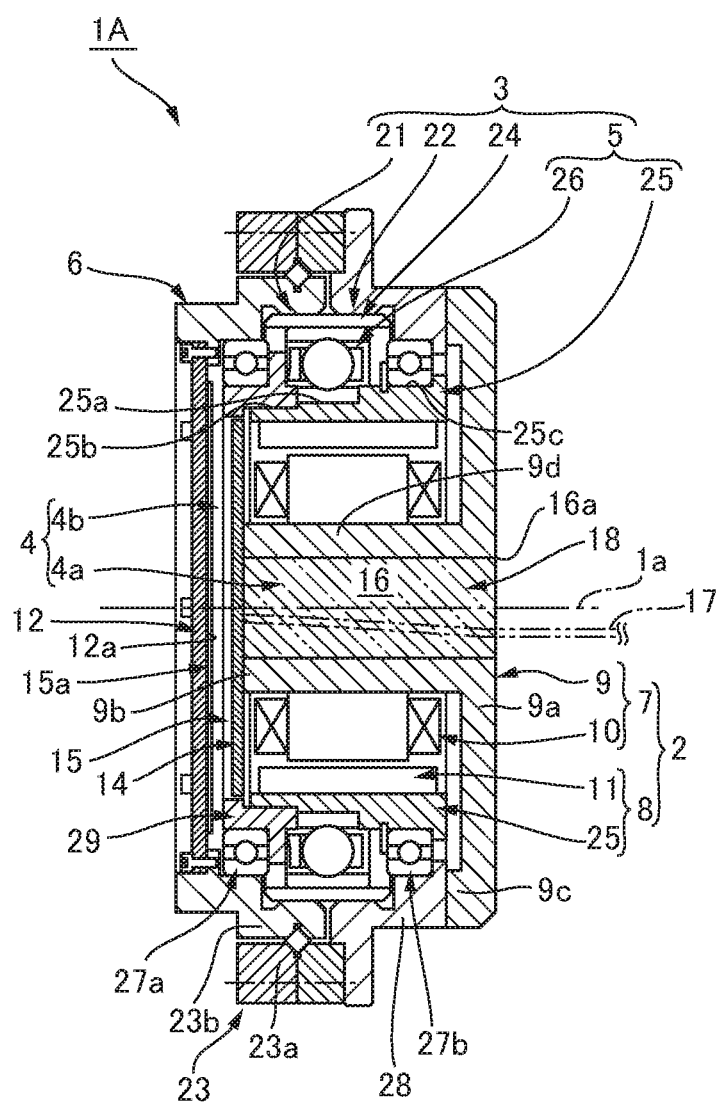
FIG. 3 is a schematic longitudinal sectional view showing a modified example of the rotary actuator of FIGS. 1(a), 1(b) and 2.

FIG. 3 is a schematic longitudinal sectional view showing a modified example of the rotary actuator 1. The rotary actuator 1A of this example has the same basic structure as of the rotary actuator 1, and therefore corresponding portions thereof are assigned the same reference numerals and explanations thereof are omitted.

The different points of the rotary actuator 1A are that the first and second oil seals 31 and 32 are omitted. The output-side end of the rotary actuator 1A is closed by the end cover 12, and the ant-output-side end thereof is closed by the core end plate part 9*a* of the stator core 9. Therefore, even if the first and second oil seals 31 and 32 are omitted, lubricant will not leak outside. Further, omitting of the first and second oil seals 31 and 32 allows to reduce friction acting on the rotor 8, and facilitate reduction in non-loading torque, which is also advantageous in making the rotary actuator 1A to be flat.

Here, even if lubricant enter the side of the hollow motor 2, no problems occur in motor functions. In this example, as the detection part 15 arranged at the output side, one that is not adversely affected by entry of lubricant is employed. Thus, no problems occur even if lubricant enters the detection part 15.

Another Embodiments

The above rotary actuators 1 and 1A employ the flat type strain wave gearing 3. Instead of the flat type strain wave gearing 3, it is possible to employ a silk-hat type strain wave gearing.

In this case, a silk-hat shaped flexible externally toothed gear is arranged in the above rotary actuator 1 or 1A, instead of the cylindrical-shaped flexible externally toothed gear and the second rigid internally toothed gear. In addition, the annular boss of the flexible externally toothed gear is sandwiched between the outer race 23*a* of the main bearing and the cylindrical case 28, and these three members are fixedly fastened.

The rotation of the motor 2 is reduced in speed in accordance with the difference in teeth numbers between the flexible externally toothed gear and the rigid internally toothed gear, and a reduced-speed rotation is taken out from the output shaft 6 through the rigid internally toothed gear 21.

The invention claimed is:

1. A rotary actuator comprising:
an outer-rotor-type motor;
a strain wave gearing which reduces a speed of input rotation inputted from the motor and outputs a reduced-speed rotation;
a device hollow part extending to pass through a wave generator and an output shaft of the strain wave gearing along a direction of a center axis line of the wave generator and the output shaft;
an end cover which is fixed to the output shaft so as to rotate integrally therewith, and closes an output-side opening of the device hollow part, the outputs-side opening being exposed on an end face of the output shaft; and
a detection part for detecting rotation of the output shaft,
wherein the motor has a stator and a rotor assembled in a wave generator-side hollow part of the device hollow part, the wave generator-side hollow part extending to pass through the wave generator; and
the detection part is arranged between the end cover and the motor in the device hollow part.

2. The rotary actuator according to claim 1, wherein the end cover has a rotation detection plate, a rotational position of which is detected by the detection part.

3. The rotary actuator according to claim 1,
wherein the stator has a stator core formed with a motor hollow part extending to pass through in the center axis direction;
an end of the motor hollow part exposes outside from an anti-output side opening end of the device hollow part, the anti-output side opening end being opened in an end face of the wave generator; and
wires from the detection part are passed through the motor hollow part and pulled out outside.

4. The rotary actuator according to claim 3, wherein the motor hollow part is sealed by sealing material together with the wires.

5. The rotary actuator according to claim 1,
wherein the wave generator has a tubular rigid plug made of magnetic material and a wave-generator bearing fitted on a non-circular outer peripheral surface formed in the rigid plug;
the rotor of the motor is constituted by the rigid plug and a rotor magnet fixed on an inner peripheral surface of the rigid plug; and
the rigid plug is supported by a first bearing and a second bearing from an outer peripheral side at both side sections of the wave-generator bearing in the direction of the center axis line in a manner sandwiching the wave-generator bearing.

6. The rotary actuator according to claim 5, wherein the output shaft is arranged at a side of the first bearing in the center axis direction, and a brake mechanism for applying a brake force on the rotor is arranged at a side of the second bearing.

7. The rotary actuator according to claim 1,
wherein the stator has a stator core and a stator magnet;
the stator core has a core cylindrical part and a core end plate part;
the core cylindrical part is arranged coaxially in the device hollow part, one end of the core cylindrical part projects from an anti-output side opening of the device hollow part, the anti-output side opening being opened in an end face of the wave generator; and
the core end plate extends radially outward from the end of the core cylindrical part so as to close the anti-output side opening.

8. The rotary actuator according to claim 1,
wherein the strain wave gearing has a first rigid internally toothed gear and a second rigid internally toothed gear arranged coaxially in parallel along the direction of the center axis, a main bearing for supporting the first and second rigid internally toothed gears in a relatively rotatable manner, and a cylindrical flexible externally toothed gear arranged inside the first and second rigid internally toothed gears;
the wave generator has a rigid plug made of magnetic material and a wave-generator bearing accommodated between the flexible externally toothed gear and a non-circular contoured outer peripheral surface portion formed in the rigid plug;

the output shaft is integrally formed or fixed on a section of the first rigid internally toothed gear located at a side opposite to the second rigid internally toothed gear;

a tubular case is integrally formed or fixed on a section of the second rigid internally toothed gear located at a side opposite to the first rigid internally toothed gear; and the rigid plug is supported in a rotatable manner by a first bearing and a second bearing, in which the first bearing is mounted on an inner peripheral surface of the output shaft located at one side in the center axis line direction and the second bearing is mounted on an inner peripheral surface of the tubular case located at the other side in the center axis line direction, the first and second bearing being positioned sandwiching the wave generator;

the wave-generator-side hollow part extends to pass through the rigid plug in the direction of the center axis, the motor stator has a stator core arranged coaxially in the wave-generator-side hollow part and a stator coil arranged on an outer peripheral surface of the stator core;

the motor rotor has the rigid plug and a rotor magnet fixed on an inner peripheral surface of the rigid plug;

the stator core has a core cylindrical part and a core end plate part;

the core cylindrical part is arranged coaxially in the device hollow part in a manner that one end of the core cylindrical part projects from an anti-output side opening of the device hollow part exposed in an end face of the wave generator;

the core end plate part is expanded outward in the radial direction from an end of the core cylindrical part to close the anti-output-side opening; and an outer circumferential end part of the core end plate part is fixed to the tubular case.

9. The rotary actuator according to claim 8, wherein the end cover has a rotation detection plate, a rotational position of which is detected by the detection part.

10. The rotary actuator according to claim 8, wherein wires from the detection part are pulled out outside through an inside of the core cylindrical part of the stator core.

11. The rotary actuator according to claim 10, wherein the motor hollow part is sealed by sealing material together with the wires.

12. The rotary actuator according to claim 8, wherein a brake mechanism for applying a brake force on the rotor is arranged between the core end plate part of the stator core and the second rigid internally toothed gear.

* * * * *